(No Model.) 2 Sheets—Sheet 2.
S. GELSTON.
PROCESS OF AND APPARATUS FOR PURIFYING AND FILTERING LIQUIDS.
No. 575,778. Patented Jan. 26, 1897.
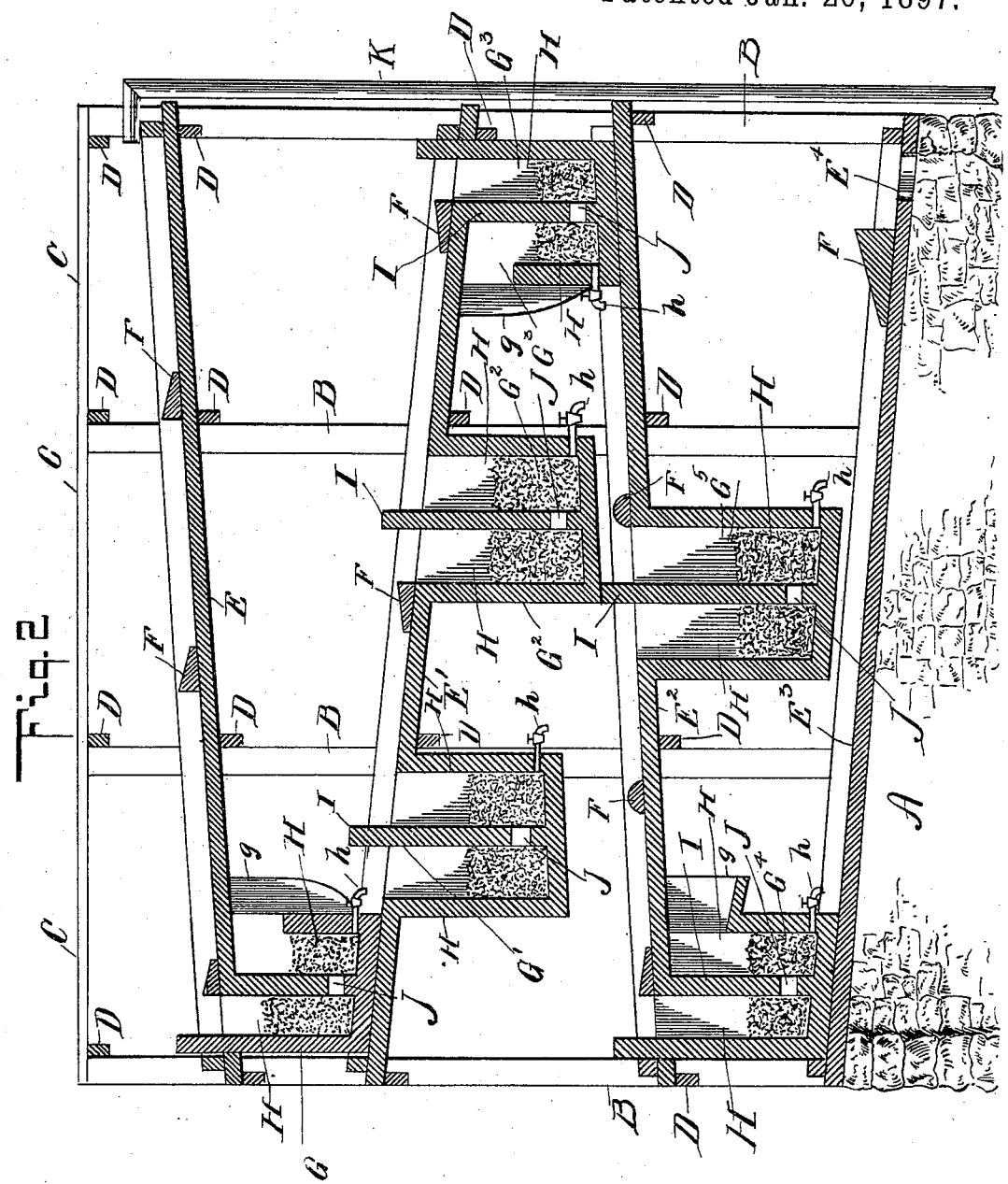
WITNESSES:
INVENTOR
Samuel Gelston
BY
ATTORNEYS

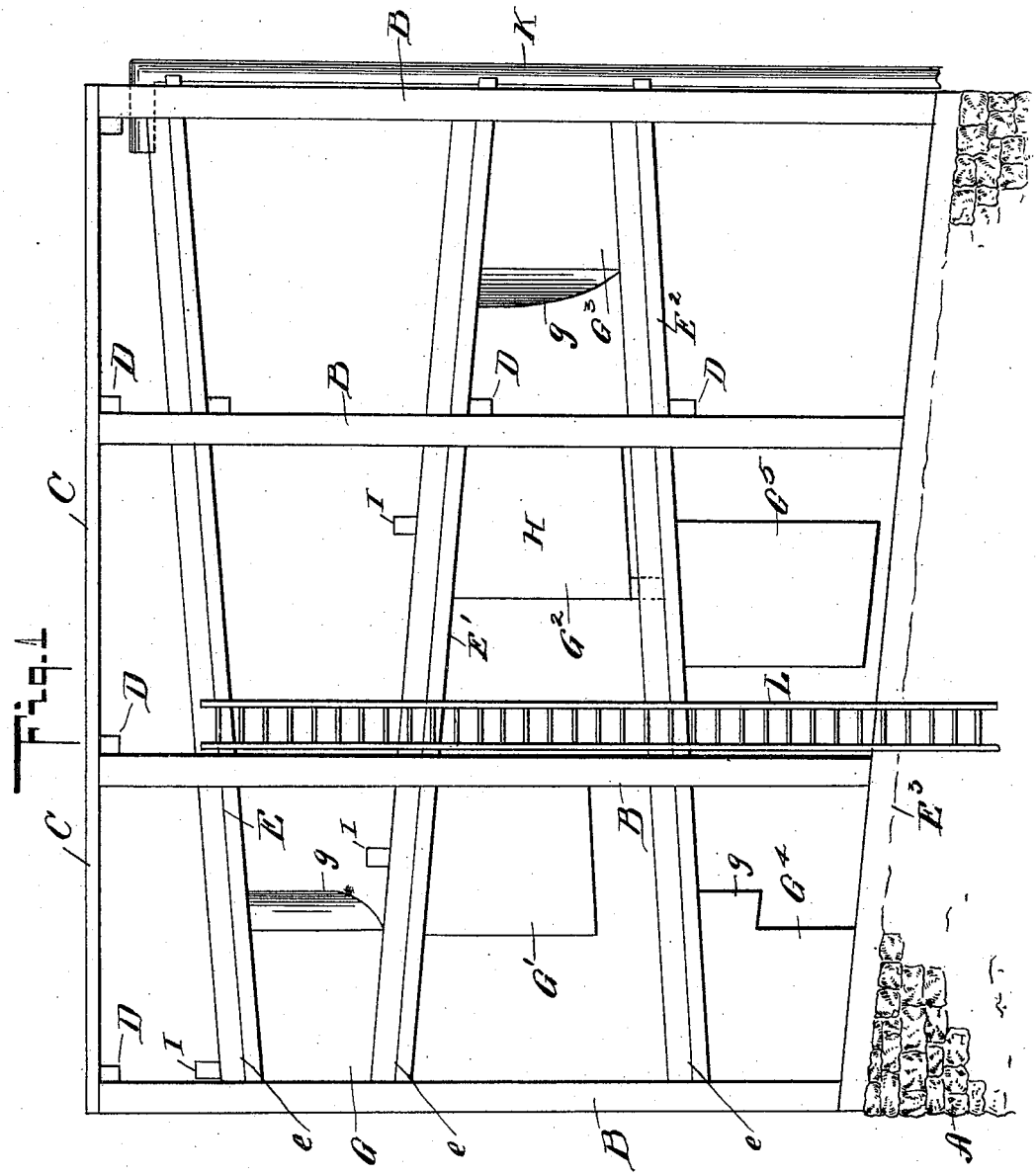

UNITED STATES PATENT OFFICE.

SAMUEL GELSTON, OF NEW YORK, N. Y.

PROCESS OF AND APPARATUS FOR PURIFYING AND FILTERING LIQUIDS.

SPECIFICATION forming part of Letters Patent No. 575,778, dated January 26, 1897.

Application filed August 15, 1895. Serial No. 559,317. (No model.)

*To all whom it may concern:*

Be it known that I, SAMUEL GELSTON, a resident of the city, county, and State of New York, have invented an Improved Apparatus for Purifying and Filtering Liquids, of which the following is a specification.

My invention relates to purifying and filtering water, and has for its object to produce an apparatus for filtering and purifying water or other liquids.

To this end my invention consists in an apparatus for purifying and filtering liquids hereinafter set forth and claimed.

My invention will be understood by reference to the accompanying drawings, in which—

Figure 1 is a side elevation of an apparatus constructed in accordance with my invention. Fig. 2 is a transverse vertical longitudinal section of the apparatus shown in Fig. 1.

In the drawings, A may be a suitable reservoir, upon which is erected a superstructure consisting of uprights B, which are preferably braced together by braces C D at the proper places and serve to support a series of inclined runways E E' $E^2$, placed one above the other. In the present instance I have also shown a runway $E^3$ supported upon the masonry of the reservoir A, but this runway may also be supported by the superstructure or framework.

Located at suitable intervals along the runways are riffles F. These riffles may be of any suitable shape, their function being to break up or subdivide the water which flows in the runways.

Located at convenient intervals along the runways are filters G G' $G^2$ $G^3$ $G^4$ $G^5$, shown as consisting of boxes H, containing filtering material, such, for instance, as sand and gravel, and each divided by a diaphragm I, which is pierced at or near the bottom thereof with a series of openings J. These openings are in the present instance above the floor of the box H, in order that sediment or other impurities in the liquid may settle and remain in the bottom of the boxes.

K is the supply-pipe, which carries the water to be purified up to the topmost runway E.

One or more of the filters, preferably the filters which form the conduits between the various runways G $G^3$ $G^4$, may be provided with suitable screens or curtains $g$ to direct the flow of the water from the filter, so that the water will be directed onto the runway and will not flow over onto the superstructure. A ladder L may also be provided for convenience in obtaining access to the runways, and along the edge of each runway a foot-board $e$ may also be run, and in order to facilitate the clearing or cleaning of the filters they may be provided with a vent-cock, hand-hole, or manhole $h$ for the ready removal of the filtering material.

The designed operation of this form of apparatus is as follows: The water to be purified is brought by the pipe K and discharged onto the runway E, where it spreads out in a thin sheet and runs down the runway, passing over, between, and around the riffles F, which serve to break up the sheet and subdivide the water minutely in order to bring a great amount of the surface of the flowing water into contact with the air, so that the water may be readily oxygenated and some of its impurities removed. From the runway E the water passes to the filter G, where it sinks in the filtering material contained in the filter on one side of the diaphragm and, flowing through the opening or openings in the diaphragm, rises through the filtering material on the other side of the diaphragm and flows out onto the runway E' and, traversing, passes in succession through the filters G' $G^2$ $G^3$ and thence to the runway $E^2$, in traversing which it passes through the filters $G^5$ $G^4$ and onto the runway $E^3$, whence it passes through the opening $E^4$ in the runway $E^3$ into the reservoir A. It will be observed that, the water passing down into the boxes H and flowing through the perforations J in the diaphragms I, there will be a body of filtering material below the level of the openings in the diaphragm which will serve to retain some of the impurities of the water. It will thus be seen that the water will traverse a long path and will be minutely subdivided at numerous places to oxygenate the water and will have some of its impurities removed by the oxygenation and some by the mechanical process of filtration, so that no matter how contaminated the water may be which flows in at the pipe K the apparatus will operate to very thoroughly remove those impurities, so that the water when it finally reaches the reservoir E will be in a pure condition.

I do not limit myself to the construction and arrangement of the apparatus herein shown and described, as the apparatus may be greatly varied without departing from the spirit of my invention.

What I claim, and desire to secure by Letters Patent, is—

The apparatus herein described for filtering and purifying water, which consists of a supply-pipe K, a series of inclined runways in communication with one another, said runways being provided with riffles thereon, a series of filters in the bed of each of said runways, each filter consisting of a box or receptacle divided by a pierced partition, whereby the water to be purified may be caused to traverse the runways and filters in series, and a reservoir in communication with the last of said runways for finally storing the water, substantially as described.

SAMUEL GELSTON.

Witnesses:
   HARRY M. TURK,
   L. FRED LONG.